Oct. 14, 1941.  E. E. HANS  2,259,341
WATER CIRCULATING SYSTEM FOR AUTOMOBILE HEATERS
Filed May 25, 1940    2 Sheets-Sheet 1
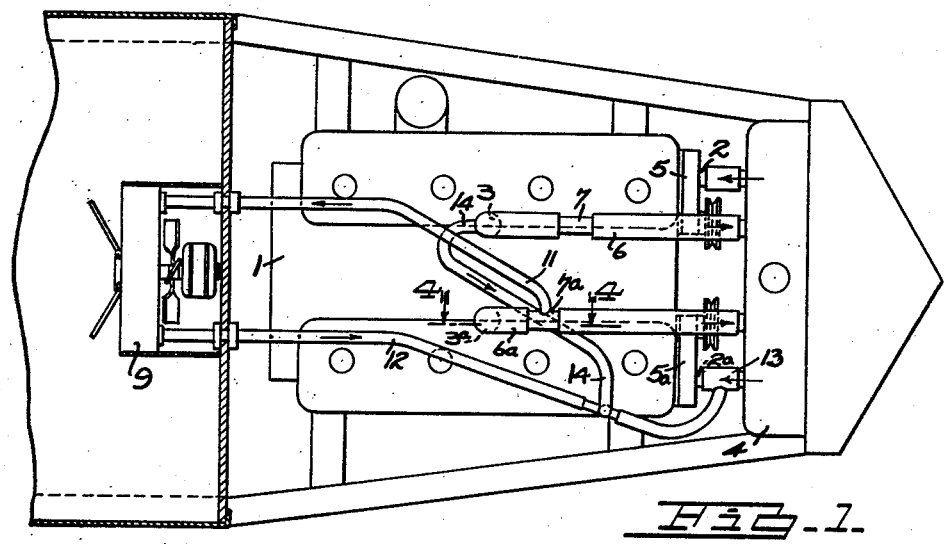
INVENTOR.
Edmund E. Hans
BY
his Attorney.

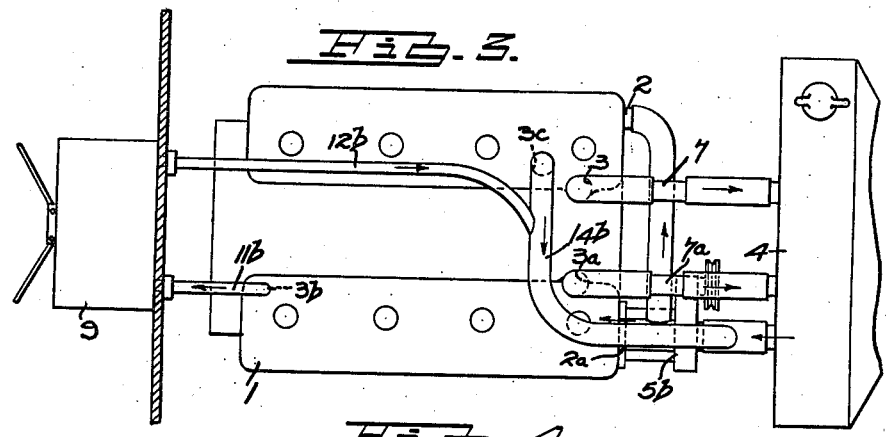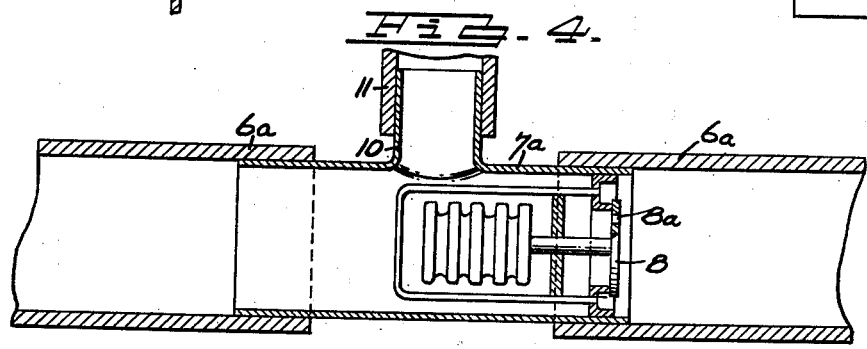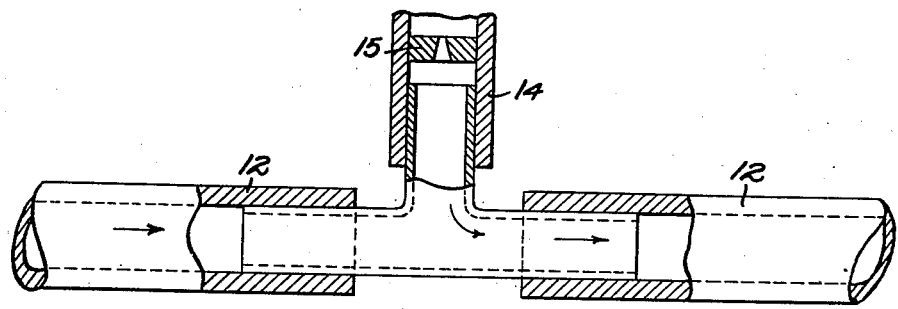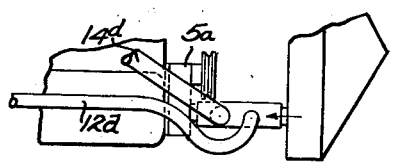

Patented Oct. 14, 1941

2,259,341

UNITED STATES PATENT OFFICE 2,259,341

WATER CIRCULATING SYSTEM FOR AUTOMOBILE HEATERS

Edmund E. Hans, Detroit, Mich.

Application May 25, 1940, Serial No. 337,258

11 Claims. (Cl. 237—12.3)

This invention relates to improvements in water circulating systems for automobile heaters, and refers more particularly to such systems connected to the cooling systems of V-type motors.

It is an object of the invention to provide a water circulating system for automobile heaters whereby hotter water is more quickly circulated through the heater when the motor is started.

Another object of the invention is to provide a water circulating system for automobile heaters whereby the drop in temperature of the water circulated through the heater is reduced to a minimum when the speed of the motor is suddenly increased.

A further object of the invention is to provide a water circulating system for use in connection with V-type motors having two separate sets of water cooling passages, whereby some of the water heated in the first set of passages is discharged into the second set of passages from which water flows to the heater, thereby increasing the temperature of the water discharged from the second set of passages and consequently the temperature of the water delivered to the heater.

Yet another object of the invention is to provide such a water circulating system wherein the water leaving the heater is returned to the second set of passages to increase the tempertaure of the water in the latter.

Another object of the invention is to provide a water circulating system for automobile heaters for connection to the cooling systems of V-type motors wherein pumped circulation is provided through two separate sets of cooling passages and the discharge from each set back to the radiator is controlled by a thermostatic valve; to provide a booster pipe from the discharge from one set of passages behind its thermostatic valve to deliver preheated water to the other set of passages, and to connect the feed line to the heater to the discharge from the other set of passages rearwardly of its thermostatic valve to circulate hot water more quickly through the heater.

Another object of the invention is to provide such a water circulating system whereby both a flow of preheated water from the first set of passages and also the return flow from the heater are both connected to the second set of passages to minimize the cooling effect upon the water circulated through the second set and delivered to the heater when the motor is suddenly accelerated and the pumped water supply from the radiator through the cooling passages increased. Moreover means are provided for restricting the flow of preheated water from the first set of passages to the second set so as not to impede the speed of flow thereto from the heater.

Having thus briefly and broadly stated some of the objects and advantages of the invention, I will now proceed to describe it in detail with the aid of the accompanying drawings, in which:

Figure 1 illustrates a plan view of my water circulating system for automobile heaters connected to a V-type motor having a separate pump to circulate water from the radiator through each set of cooling passages, and Figure 2 is a side elevation thereof.

Figure 3 is a plan view showing a modified arrangement wherein the water is circulated through both sets of cooling passages by a single pump.

Figure 4 is an enlarged section on the line 4—4 of Figure 1.

Figure 5 is an enlarged sectional view showing the return pipe from the heater and a connection therein for the booster pipe from the first set of cooling passages.

Figure 6 is a detail showing a modification of the connections of the booster pipe and heater return to the second set of cooling passages.

Referring to the drawings, I will first describe one of the conventional cooling systems for V-type motors to which my water circulating system for heaters is applied. 1 designates a V-type motor having separate sets of cooling passages formed in each side thereof. 2 and 2a denote inlets into these cooling passages, and 3 and 3a indicate outlets therefrom. Each inlet 2 and 2a, in the arrangement shown in Figures 1 and 2, is connected to the bottom of a radiator 4 through separate pumps 5 and 5a respectively; and in the modification shown in Figure 3 the two inlets 2 and 2a are fed through a common pump 5b again connected to the bottom of the radiator 4. Suitable piping 6 and 6a extends from the outlets 3 and 3a back to the upper portion of the radiator 4 and has thermostatically operated valves provided therein intermediately of their length at 7 and 7a respectively. The thermostatic valves which are identical have valve plates 8 provided therein, as shown in Figure 4, and these plates are apertured as indicated at 8a to prevent the formation of air locks in the cooling passages, and consequently permits quite a small flow of water to return from the cooling passages back to the radiator at all times, though the valve plate 8 is only moved to open position when the temperature of the water reaches a predetermined degree of heat. Provided in the car in which the motor 1 is mounted is a conventional hot water heater 9.

Referring first to Figures 1, 2, 4 and 5 of the drawings, connected to the body of the thermostatic valve 7a, between the outlet 3a from the second set of passages and the valve plate 8, is a connection 10 from which a feed line 11 extends to the heater 9, and from the latter a return line 12 extends which terminates in a connection 13 located between the radiator 4 and the pump 5a by which water is fed into the second set of cooling passages in the motor 1. Extending from adjacent the outlet 3 from the first set of passages, and behind the thermostatic valve 7, is a booster pipe 14 which terminates in the return line 12 intermediately of the length of the latter. Mounted in the booster pipe 14 adjacent the line 12 is a reducer 15, shown in Figure 5 in the form of an inserted disc having a tapered central opening therethrough of outwardly increasing size.

The operation of the circulating system is as follows: When the motor 1 is started water in both sets of cooling passages commences to heat. The preheated water discharged from the first set of cooling passages through the outlet 3, due to the fact that the thermostatic valve 7 is closed, flows almost entirely through the booster pipe 14. Meanwhile water from the outlet 3a from the second set of passages circulates through the feed line 11, the heater 9 and back through the return line 12. The flow through both the booster pipe 14 and the return line 12 mix in the discharge end of the latter and as the water coming through the pipe 14 is warmer, when the motor is started at least, it raises the temperature of the mixed water introduced to the pump 5a. At this time however, the thermostatic valve 7a is closed so that only sufficient water can be delivered through the pump 5a into the second set of passages to compensate for the amount discharged through the feed line 12 plus the amount that escapes through the apertured plate in the thermostatic valve 7a which is similar in construction to the valve shown in Figure 4; the rest of the mixed water, which is under pressure from the pumps 5 and 5a, passes through the connection 13 into the bottom of the radiator 4. In this manner hotter water is more quickly circulated through the heater 9. Due also to the restricted flow from the booster pipe 14 through the reducer 15 into the return line 12 the speed of flow of the return through the line 12 is not materially lessened. Thus a rapid flow at high temperature quickly occurs through the heater and the return therefrom contributed materially to cause a higher temperature flow through the second set of cooling passages between the inlet 2a and the outlet 3a.

When the motor is in operation and the water in the cooling passages has become heated, the temperature of this water quickly increases and opens the thermostatic valves considerably when the motor is reduced to idling speed and the car stops. Then if the engine is suddenly accelerated a considerable flow of water discharged through the open valves causes a sudden drop in the temperature of the water discharged from both sets of passages; but due to the fact that a mixture of water from the booster pipe 14 and the return line 12 is delivered through the inlet 2a the drop in temperature of the water passing through the second set of passages is minimized, and is materially less than that of the water passing through the first set of passages and out of the outlet 3. Again, in order to maintain a high degree of heat in the heater 9 I prefer to set the thermostatic valve 7a for a temperature approximately ten degrees higher than the valve 7; the preferred temperatures for which these valves are set are 170 and 160° F., respectively, because due to the radiating capacity of a V-type motor and the fact that the water returning from the two sets of passages back to the radiator strikes an average when mixed it is found that such an increased temperature can be safely carried in the second set of passages without the necessity for disturbing this setting throughout the summer.

In the modified arrangement shown in Figure 3 only one pump 5b is provided to feed water through the inlets 2 and 2a into both sets of cooling passages. In this case the feed line 11b to the heater 9 extends from an opening 3b in the motor in communication with the second set of passages from which water flows back to the radiator 4 through the outlet 3a. The booster pipe 14b extends from an opening 3c in the motor in communication with the first set of passages the outlet 3 from which is connected to the radiator 4. The return line 12b from the heater runs into the booster pipe 14b intermediately of the length of the latter, and this booster pipe is connected to the suction side of the pump 5b. In this instance also the flow through the booster pipe 14b is similarly restricted adjacent and rearwardly of its connection to the return line 12b to prevent a material decrease in the speed of flow through the latter. It is of course apparent that in this arrangement the circulation is essentially the same, because water is still drawn from the first set of passages into the booster pipe 14b irrespective of whether the thermostatic valve 7 is open or not, and similarly the feed line 11b to the heater 9 is connected to the second set of passages in the motor 1 so that, irrespective of whether the thermostatic valve 7a is open or not, hot water may flow therethrough to the heater.

In the further modification shown in Figure 6 the arrangement is the same as that already shown except that the booster pipe 14d and the return line 12d from the heater are separately connected to the inlet side of the pump 5a.

While in the foregoing the preferred embodiments of the invention have been described and shown, it is understood that additional alterations and modifications may be made thereto provided the said alterations and modifications fall within the scope of the appended claims.

What I claim is:

1. A water circulating system for an automobile heater for connection to a V-type motor having two separate sets of water cooling passages therein, a radiator, and separate inlets and outlets for each set of passages connected to the radiator, comprising a booster pipe connecting one set of passages with the inlet to the other set of passages, a heater, a feed line extending from the other set of passages to the heater, and a return line from the heater connected to the inlet to the said other set of passages.

2. A water circulating system for an automobile heater for connection to a V-type motor having two separate sets of water cooling passages therein, a radiator, and separate inlets and outlets for each set of passages connected to the radiator, comprising a booster pipe connected to the outlet from one set of passages and also to the inlet to the other set of passages, a heater, a feed line from the outlet from the other set of passages connected to the heater, and a return line from the heater connected to the inlet to the other set of passages.

3. A water circulating system comprising the combination set forth in claim 1 wherein the return line and the booster pipe are united prior to their connection to the other set of passages, including means restricting the flow from the booster pipe into the united pipe portion.

4. A water circulating system for an automobile heater for connection to a V-type motor having two separate sets of water cooling passages therein, a radiator, separate inlets and outlets for each set of passages connected to the radiator, and at least one pump for supplying water from the radiator to the inlets, comprising a booster pipe connecting one set of passages to the pump supplying water to the other set, a heater, a feed line from said other set of passages to the heater, and a return line from said heater to the pump supplying water to the other set of passages.

5. A water circulating system comprising the combination set forth in claim 4, wherein the return line and the booster pipe are united prior to their connection to the pump supplying water to the other set of passages, and means restricting the flow from the booster pipe into the united pipe portion.

6. A water circulating system for an automobile heater for connection to a V-type motor having two separate sets of water cooling passages therein, a radiator, separate inlets and outlets for each set of passages connected to the radiator, and at least one pump for supplying water from the radiator to the inlets, comprising a booster pipe connecting the outlet from one set of passages to the pump supplying water to the other set, a heater, a feed line from the outlet from the other set of passages connected to the heater, and a return line from the heater connected also to the pump supplying water to the other set of passages.

7. An arrangement of the character described comprising a motor having two separate sets of water cooling passages therein, a separate inlet and outlet for each set of passages, a radiator connected to said inlets and outlets, a booster pipe connecting one set of passages with the other, a heater, a feed line from the other set of passages to said heater, and a return line from the heater also connected to said other set of passages.

8. An arrangement of the character described comprising a motor having two separate sets of water cooling passages therein, a separate inlet and outlet for each set of passages, a radiator, the inlets being adjacent the bottom of the motor and the outlets adjacent the top thereof, means connecting each outlet with the radiator, at least one pump connected to the radiator and to the inlets, a booster pipe connected adjacent the top of one set of passages and to the pump by which water is fed into the other set of passages, a feed line connected to the other set of passages adjacent the top of the motor, a heater connected to the feed line, and a return line from the heater also connected to the pump by which water is fed into said other set of passages.

9. An arrangement of the character described comprising a motor having two separate sets of water cooling passages therein each set having an inlet and an outlet, a radiator, means connecting each of said inlets with the radiator, a pump in each connecting means, means connecting each of said outlets with the radiator, a thermostatic valve in each of the latter connecting means, a booster pipe connecting one of said latter connections between the outlet from one set of passages and its thermostatic valve with the pump connected to the other set of passages, a heater, a feed line extending to the heater from the connecting means between the other thermostatic valve and the outlet from the other set of passages, and a return line from the heater connected to the last named pump, said thermostatic valves being responsive to the temperature of water flowing through their respective connecting means from the outlets.

10. An arrangement of the character described comprising a motor, having two separate sets of water cooling passages therein each having an inlet and an outlet, a radiator, means connecting each of said inlets with the radiator, a pump in each connecting means, means connecting each of said outlets with the radiator, a thermostatic valve in each of the latter connecting means, said valves being set to open at different temperatures, a booster pipe connected to one of said latter connecting means between the valve set to open at a lower temperature and the outlet connected thereto, said booster pipe being also connected to the pump for the other set of passages, a heater, a feed line connected to the heater and to the connecting means between the thermostatic valve set to operate at a higher temperature and the outlet from the other set of passages, and a return line from the heater connected to the last named pump, said thermostatic valves being responsive to the temperature of water flowing through their respective connecting means from the outlets.

11. A water circulating system including a motor having two separate sets of water cooling passages therein each set having an inlet and an outlet, pump means connected to said inlets for supplying water to said sets of passages under pressure, a booster pipe connecting the outlet from one set of passages to the pump means for the other set for delivering preheated water under pressure to said pump means, a heater, a feed line extending from the other set of passages to the heater, and a return line from the heater to the pump means for the other set of passages through which additional heated water under pressure is delivered to the pump means for said other set.

EDMUND E. HANS.